3,233,511
STILL PICTURE PROJECTOR WITH FOLDABLE
MAGAZINE GUIDE
Karl Deeg, Unterhaching, Munich, and Wilfried Hofmann, Munich, Germany, assignors to Agfa Aktiengesellschaft, Leverkusen, Germany
Filed Jan. 21, 1964, Ser. No. 339,264
Claims priority, application Germany, Jan. 24, 1963,
A 42,160
15 Claims. (Cl. 88—28)

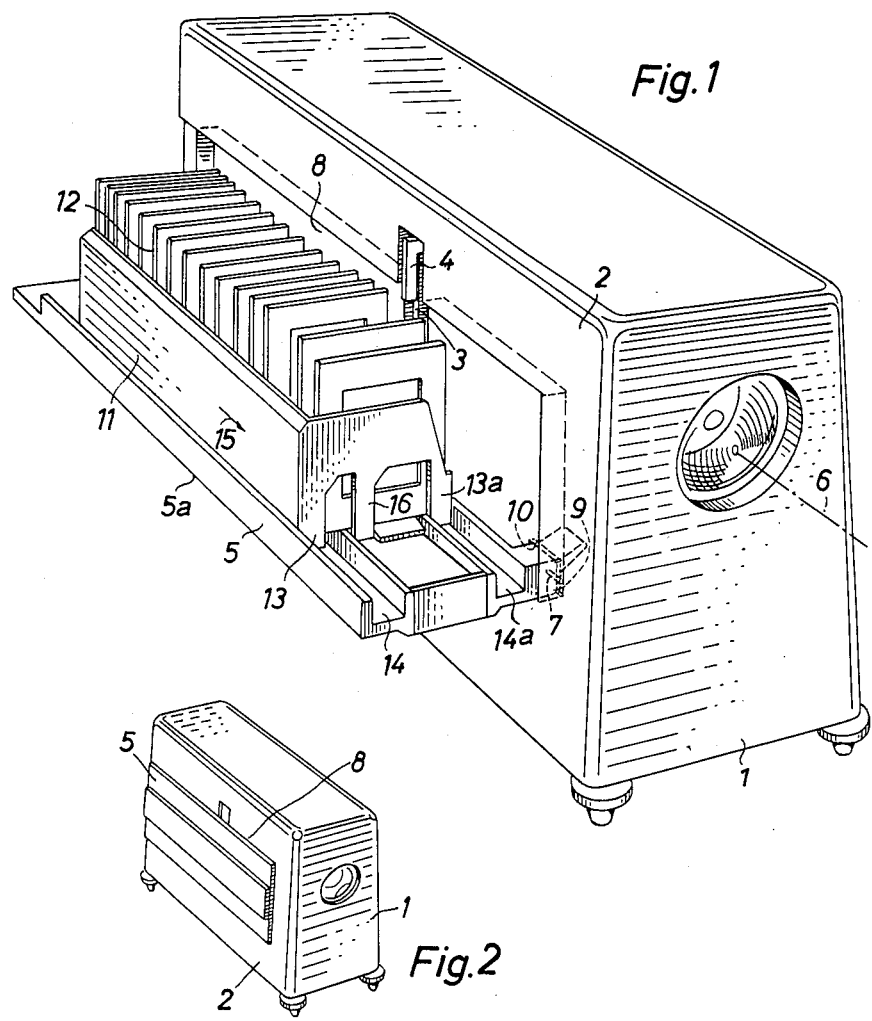

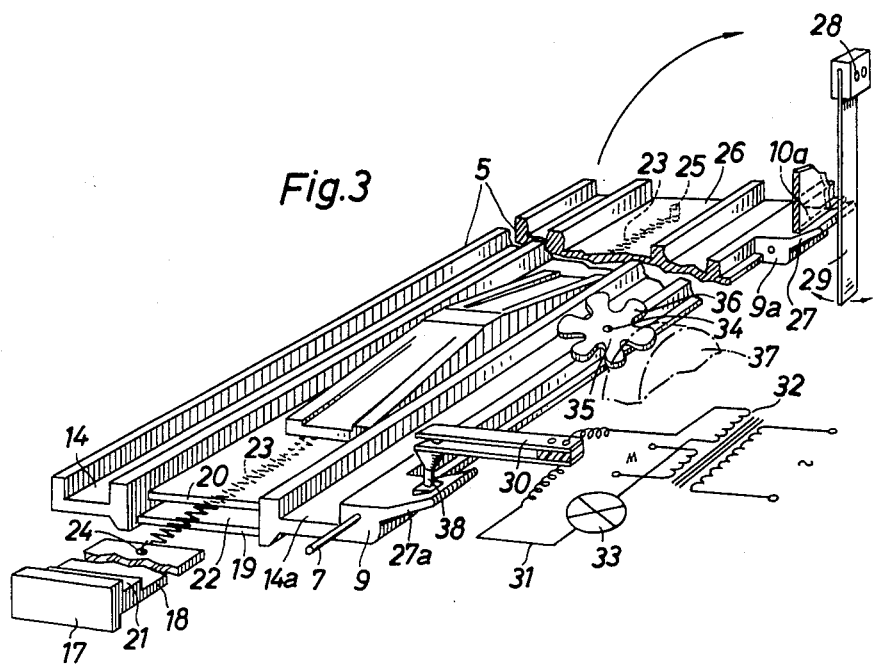

The present invention relates to photographic projectors, and in particular to projectors for still pictures.

Photographic projectors of this type may have, for example, a substantially tunnel-shaped portion through which an elongated magazine is guided while pictures carried thereby are automatically or semi-automatically moved to and from the optical axis so as to be projected in the manner well known in the art. Such photographic projectors, although they protect the structure from dust and other exterior undesirable influences, nevertheless have the disadvantage of subjecting the pictures to a considerable amount of heat. As long as the structure operates properly, there is no particular problem. However, it does happen that sometimes parts will become jammed, and in this case the pictures, often in the form of delicate color transparencies, will become damaged because they remain too long in a place where they are subjected to a temperature which is too high. For example, if a transparency or a frame thereof is damaged, it can sometimes happen that the structure for handling the transparency will become jammed, and then the entire magazine will be situated within the projector with the still pictures subject to extremely high temperatures. If the projector is not of the type which permits ready disassembly of the structure to enable the magazine to be removed, then of course permanent damage may result.

In order to avoid the above drawbacks it has already been proposed to provide projectors of the above type with guides for a magazine where the magazine is substantially open and not covered by the structure of the projector, and in fact in some cases the magazine will project only partly into the interior of the housing, but all such structures, while they do indeed provide a certain advance over guiding tunnels through which the magazine moves, nevertheless are of disadvantage because they make the projector quite bulky and require to much material for the manufacture of the projector.

It is accordingly a primary object of the present invention to avoid the above drawbacks by providing for a projector of the above type a structure which will guide a magazine while permitting the latter to be removed at any time and while at the same time maintaining the size of the magazine to relatively small dimensions and without requiring any particularly large amount of material in the construction of the projector.

A further object of the present invention is to provide a structure of the above type which can be very easily and quickly placed between rest and operating positions and which in the rest position is extremely compact.

Also, it is an object of the present invention to provide a structure of the above type wherein an elongated magazine will at all times be properly supported in a horizontal plane while pictures carried thereby are exposed one after the other either automatically of semi-automatically.

Furthermore, it is an object of the present invention to provide a structure where a magazine support will be automatically shifted between a rest and an operating position after it is initially displaced by the operator part of the way between these positions.

Furthermore, it is an object of the present invention to provide a structure of the above type wherein certain parts of the projector, such as the lamp thereof, are capable of being automatically turned on when the structure associated with the magazine is placed in a position for receiving the magazine.

The objects of the present invention also include the provision of a structure which is capable of accomplishing all of the above objects while at the same time being composed of simple rugged elements which are very reliable in operation.

With these objects in view, the invention includes, in a photographic projector for still pictures, a housing means having a side wall formed with an elongated exterior recess, and a magazine guiding means, which is elongated and substantially rigid, and which has a rest position where it is situated within this recess and is substantially flush with the exterior surface of the side wall of the housing means. A pivot means is carried by this side wall of the housing means and is operatively connected to the magazine guiding means to connect the latter to the side wall for swinging movement relative thereto between a rest position where the magazine guiding means is situated within this recess and an operating position where the magazine guiding means projects laterally from the side wall of the housing means and is situated substantially in a horizontal plane for supporting an elongated magazine for longitudinal movement along the side wall of the housing means. The magazine guiding means is provided with all of the structure which is required for guiding the magazine, and in addition it is adapted to carry at least part of the structure for advancing a magazine in a stepwise manner during the successive projection of photographs carried thereby. An overcenter spring means is provided, in accordance with the invention, to cooperate with the magazine guiding means for yieldably urging the latter to both of the above positions thereof once the operator has swung the magazine guiding means through and beyond a given dead center position of the overcenter spring means. Furthermore, a projection lamp of the projector is adapted to be automatically turned on, in a manner described below, when the magazine guiding means is swung from its rest to its operating position, and in addition an extension means cooperates with the magazine guiding means for projecting forwardly beyond the latter as a magazine advances forwardly beyond the magazine guiding means so as to support the magazine even when the front end thereof projects to a considerable distance beyond the magazine guiding means, so that in this way the magazine will always be reliably maintained in a horizontal attitude and preventing against tilting or falling from the magazine guiding means.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a perspective side view of one possible embodiment of a photographic projector according to the present invention, the magazine guiding means of the invention being shown in its operating position in FIG. 1;

FIG. 2 is a perspective illustration of a structure of FIG. 1 with the magazine guiding means in its rest position; and FIG. 3 is a fragmentary, partly schematic, perspective illustration of the magazine guiding means of the invention, FIG. 3 showing the details of the structure as well as elements which cooperate with the magazine guiding means of the invention.

Referring now to the drawings, there is shown in FIGS. 1 and 2 a housing means 1 of a photographic projector for still pictures, and this housing means 1 includes a side wall 2 formed with a cutout 3 where a gripper 4 for the pictures is situated to return a projected photograph and engage a new one for movement to a projecting position, in a manner well known in the art and by the way of example described in the U.S. Patent No. 2,878,604. The particular mechanism for changing a projected picture for a picture to be projected and for shifting the pictures between the projection position and the magazine is not part of the present invention and is not further described or shown since it is well known.

Approximately at the height of the lower end of the cutout 3 is located an elongated substantially rigid magazine guiding means 5 in the form of a plate having the configuration shown in the drawings, and this magazine guiding means 5 extends longitudinally along the side wall 2 in the manner illustrated. The magazine guiding means extends in a direction which is parallel to the optical axis 6, and a pivot means 7 is carried by the side wall 2 of the housing means 1 and is operatively connected to the magazine guiding means 5 to connect the latter to the side wall 2 for swinging movement relative thereto between the rest position shown in FIG. 2, where the magazine guiding means 5 is located substantially in its entirety directly next to the wall 2, and the operating position shown in FIG. 1 where the magazine guiding means 5 projects laterally from the wall 2 and is situated in a horizontal plane to carry the magazine 11 and guide the latter for movement in the direction of the arrow 15 longitudinally along the side wall 2. The pivot means can simply take the form of pivot pins 7 fixedly carried by portions of the side wall 2 and extending into suitable openings of the magazine guiding means 5.

In accordance with the particular feature of the invention the side wall 2 is formed at its exterior with an elongated recess 8 the configuration of which corresponds to the size and configuration of the magazine guiding means 5 so that when the latter is in its rest position shown in FIG. 2 it will be situated within the recess 8 and will be substantially flush with the exterior surface of the wall 2, so that in this way an extremely compact assembly requiring very little material is provided.

A limiting means is provided for limiting the swinging of the magazine guiding means 5 from the rest position of FIG. 2 into the operating position of FIG. 1, so that this limiting means will maintain the magazine guiding means 5 when it reaches the operating position of FIG. 1 in a horizontal plane, and this limiting means takes the form of projecting portions 9 and 9a (FIGS. 1 and 3) of the magazine guide means 5 which engage stationary portions 10 and 10a, respectively, fixedly carried by the housing means 1 when the magazine guide means 5 has been turned from the position of FIG. 2 into the position of FIG. 1, so that in this way the engagement of the projections 9 and 9a respectively with the portions 10 and 10a fixedly carried by the housing prevent the magazine guide means 5 from turning below the horizontal position thereof shown in FIG. 1.

The magazine 11 is shown on the guide means 5 in FIG. 1, and this magazine 11 carries the pictures 12 which are to be projected, these pictures being in the form, for example, of framed transparencies well known in the art, and in fact the magazine 11 itself is a conventional magazine well known in the art. The magazine 11 advances in a stepwise manner in the direction of the arrow 15 along the guide means 5 so that the pictures 12a one after the other may be projected, as pointed out above, and it will be seen that the guide means 5 is formed with a pair of parallel longitudinal grooves 14 and 14a respectively receiving lateral, downwardly extending projections 13 and 13a of the magazine 11 so that in this way the guide means 5 cooperates with the magazine 11 to guide the latter for longitudinal movement along the side wall 2 of the housing means 1.

During the advance of the magazine 11 its front end will move forwardly beyond the front end of the guide means 5, and in order to prevent the front end of the magazine 11 from tilting downwardly, an extension means 18 is provided to cooperate with the guide means 5 so as to project forwardly therefrom and support the magazine 11 when it projects forwardly beyond the guide means 5. As is apparent particularly from FIG. 3, the guide means 5 has a pair of longitudinal walls 19 and 20 with the wall 20 spaced above the wall 19 when the magazine guiding means 5 is in its operating position shown in FIG. 3, and these walls 19 and 20 define between themselves an elongated space 22 within which the extension means 18 is situated for longitudinal shifting movement relative to the magazine guide means 5, and the space 22 is open at least at its front end and the extension means 18 has a rest position where it entirely overlaps the guide means 5, which is to say no part of the extension means 18 projects beyond the guide means 5 in the rest position of the extension means 18. The extension means 18 is provided at its front end with a projection 17 which is located in the path of forward movement of the magazine 11 to be engaged by the intermediate front projection 16 thereof, and in this way as the magazine continues to advance forwardly beyond the guiding means 5 its front end will advance the extension means 18 forwardly with respect to the magazine guiding means 5 so that at all times the front of the magazine will be supported by the extension means 18 and thus the front end of the magazine 11 will be prevented from tilting downwardly as the magazine advances forwardly beyond the magazine guiding means 5. The front lower edge of the magazine 11 engages a ledge 21 of the extension means 18, this ledge 21 being situated directly behind the projection 17 and maintaining the magazine in a horizontal attitude as it advances forwardly beyond the guiding means 5.

A spring means 23 is provided for automatically returning the extension means 18 to its initial, rest position relative to the magazine guiding means 5 whenever a magazine is removed from the magazine guiding means 5 or does not project forwardly beyond the front end thereof, and in the illustrated example this spring means 23 takes the form of an elongated coil spring connected at its rear end to a pin 25 carried by the magazine guiding means 5 at its rear end 26 and hooked at its front end to an opening 24 formed in the extension means 18, so that this spring means 23 while yielding during forward advance of the magazine 11 and the forward advance of the extension means 18 therewith, nevertheless will automatically retract the extension means 18 to the position shown in FIG. 1 when the magazine does not project forwardly beyond the magazine guiding means 5, and it will be noted that in the position of FIG. 1 the front end of the extension means 18 is flush with the front end of the guiding means 5 and will turn with the latter into the recess 8, as described above. When the extension means 18 is in its initial rest position the spring 23 is tensioned to a predetermined extent so that the moment when the magazine is removed the extension means 18 will be automatically retracted.

The structure of the invention also includes an overcenter spring means for yieldably urging the magazine guiding means 5 into its rest position shown in FIG. 2 as well as into its operating position shown in FIGS. 1 and 3, and the dead center position of the overcenter spring means is reached when the magazine guiding means 5 is between its rest and operating position so that once it moves in one direction or the other beyond the dead center position of the overcenter spring means this overcenter spring means will automatically continue the movement of the magazine guiding means 5 all the way up to one or the other of its positions. The overcenter spring means includes an extension 27 forming a projection integral with and projecting from the portion 9a of the magazine guide means 5, this projection 27 making an obtuse angle with the plane of the magazine guide means 5, and the overcenter spring means further includes an elongated leaf spring 29 fixed by suitable pins 28 or the like to the housing 1 at the wall 2 thereof within the interior of the housing 1. The force of the leaf spring 29 acts substantially perpendicularly to the turning axis of the magazine guiding means 5. The projection 27 of course turns with the magazine guiding means 5 and between the rest and operating positions of the later the outer edge of the projection 27 will deflect the leaf spring 29 to a maximum extent, corresponding to the dead center position of the overcenter spring means 27–29. Thus, assuming that the guiding means 5 is to be turned from the position of FIG. 3 back into the position of FIG. 2, then the operator will first manually turn the guiding means 5 toward its rest position and once the outer edge of the projection 27 deflects the leaf spring 29 to its maximum extent, the continued turning of the magazine guiding means 5 will be augmented by the force of the spring 29 which now acts on the projection 27 to snap the magazine guide means 5 into the rest position of FIG. 2. On the other hand, when the magazine guiding means 5 is turned downwardly from the position of FIG. 2 toward that of FIG. 3 the projection 27 will again deflect the spring 29 which will have its maximum deflection before the magazine guiding means 5 has reached its operating position, and once this dead center position is reached the continued turning of the magazine guiding means 5 will be brought about by the spring 29 pressing against the projection 27 to turn the magazine guiding means 5 to its operating position shown in FIGS. 1 and 3. Thus, this overcenter spring means 27–29 will act to automatically maintain the magazine guiding means 5 either in its rest position shown in FIG. 2 or in its operating position shown in FIGS. 1 and 3.

In addition, the movement of the magazine guiding means 5 from its rest to its operating position is used for turning on certain parts of the projector. For example, as is shown diagrammatically in FIG. 3, the projector includes a lamp 33 located in an electrical circuit 31 and energized from a suitable source of alternating current through the transformer 32. The circuit 31 includes the switch 30 which is normally open. The magazine guiding means 5 has a switch-actuating means connecting thereto for turning movement therewith, and this switch-actuating means cooperates with the switch 30 to automatically close the latter and thus energize the lamp 33 whenever the magazine guiding means 5 reaches its operating position shown in FIGS. 1 and 3. This switch-actuating means includes projection 27a integral with and extending beyond the portion 9 of the magazine guiding means 5, and this projection 27a fixedly carries a switch-engaging pin 38 which engages the switch 30 and closes the latter when the magazine guiding means 5 reaches its operating position, the switch 30 of course being located in the path of movement of the pin 38 to be engaged and closed by the latter so that in this way the lamp 33 is automatcially turned on when the magazine guiding means 5 is turned to its operating position.

As is well known in the art, the magazine 11 will be advanced in a stepwise manner during operation of the projector, and in accordance with a further feature of the invention at least part of the magazine advancing structure is carried directly by the magazine guide means 5. In the illustrated example there is a rotary magazine advancing means in the form of a gear 35 supported for rotary movement by a pin 34 which is fixed to the magazine guiding means 5, and the rotary magazine advancing means 35 is located in the same plane as the magazine guiding means 5. A transmission means is carried by the housing means 1 for transmitting movement to the rotary magazine advancing means 35, and when the magazine guiding means 5 is turned to its operating position the rotary magazine advancing means 35 moves into mesh with the motion transmitting means, as by meshing with the teeth of a rotary drum gear 37 of the transmission means. This rotary transmission member 37 forms part of a conventional transmission which forms no part of the invention and which is not further illustrated but which serves to initiate the stepwise advance of the magazine in synchronism with the successive projection of the pictures carried thereby. The teeth 36 of the rotary gear 35 are so arranged that they extend into the path of the portion of the magazine which is guided by the groove 14a, and these teeth are adapted to mesh with the teeth of an elongated rack carried by the magazine 11 in a conventional manner along its side which is adjacent to the wall 2 with these teeth extending downwardly so that teeth 36 can mesh with the teeth of the rack for advancing the magazine 11 during the stepwise rotation of the magazine advancing means 35. As a result of this preferred construction according to which the magazine advancing gear 35 forms a component of the magazine guiding means 5, very substantial constructive advantages are achieved. Of course, it is possible to use other motion transmitting constructions for the purpose of advancing the magazine. Thus, the elements 35 and 37 may take the form of a pair of bevel gears which mesh with each other when the magazine guiding means 5 has been turned to its operating position but which have a conical angle which is small enough so that proper movement of the bevel gear carried by magazine guiding means 5 into and out of mesh with the bevel gear corresponding to the element 37 will take place during turning of the magazine guiding means 5 to and from its operating position, respectively. For this purpose the apex of the cone of which each bevel gear forms a part should have an angle of less than 30°. In addition, although the above-described structure of FIG. 3 is preferred, because of its great simplicity and because of the very small space required for the parts, it is also possible to use a lever drive where a push rod is provided which cooperates with the rotary magazine advancing means 35 for providing the stepwise turning thereof.

Where the magazine guiding means is provided with a switch-actuating means to close the switch 30 so as to energize the lamp 33, as described above, the projector will be provided with a second switch for controlling the remaining electrical elements of the projector, and this second switch will of course have to be actuated by the operator in order to initiate the operation of the projector after the lamp has been turned on in the manner described above.

Furthermore, with respect to the extension means 18, it is quite possible to eliminate the spring 23, in which case it would only be necessary for the operator to return the extension means 18 manually to its initial position shown in FIG. 1. However, the spring 23 is preferred since in this way the extension means 18 is automatically retracted. In order to eliminate any sudden impact or shock when the extension means 18 reaches its initial position, suitable springy stop members may be provided not only at the rear end 26 but also at the front end of the magazine guiding means 5 to cushion the movement of the extension means 18 by the spring 23.

It will be understood that each of the elements described above, or two or more together, may also find a useful application in other types of projectors differing from the types described above.

While the invention has been illustrated and described as embodied in projectors for still pictures, it is not in-

What is claimed as new and described to be secured by Letters Patent is:

1. In a photographic projector for still pictures, in combination, housing means having a side wall formed with an elongated exterior recess; elongated, substantially rigid magazine guiding means having a rest position located within said recess; and pivot means carried by said wall of said housing means and operatively connected to said guiding means for guiding the latter for swinging movement between said rest position and an operating position where said magazine guiding means projects laterally from said side wall of said housing means and is located substantially in a horizontal plane for guiding a magazine for longitudinal movement along said housing means next to said side wall thereof.

2. In a photographic projector for still pictures, in combination, housing means having a side wall formed with an elongated exterior recess; elongated, substantially rigid magazine guiding means having a rest position located within said recess and when in said rest position being substantially flush with the exterior surface of said side wall; and pivot means carried by said side wall and operatively connected to said magazine guiding means for connecting the latter to said side wall for swinging movement between said rest position and said operating position where said magazine guiding means projects laterally from said side wall and is located substantially in a horizontal plane for guiding an elongated magazine along said side wall of said housing means.

3. In a photographic projector for still pictures, in combination, housing means having a side wall formed with an elongated recess; elongated, substantially rigid magazine guiding means having a rest position situated within said recess at the exterior of said side wall of said housing means; pivot means carried by said side wall of said housing means and pivotally supporting said magazine guiding means for swinging movement from said rest position to an operating position where said magazine guiding means projects laterally from said side wall and is located substantially in a horizontal plane for supporting and guiding an elongated magazine for movement longitudinally along said side wall next to the latter; and means for cooperating with a magazine guided by said magazine guiding means for controlling the stepwise advance thereof during projection of pictures carried by the magazine, said means for controlling the stepwise advance of said magazine being carried, at least in part, by said magazine guiding means.

4. In a photographic projector for still pictures, in combination, housing means having a side wall formed with an elongated exterior recess; elongated, substantially rigid magazine guiding means having a rest position situated within said exterior recess of said side wall; pivot means carried by said side wall and operatively connected to said magazine guiding means for pivotally connecting the latter to said side wall for swinging movement relative thereto between said rest position and an operating position where said magazine guiding means projects laterally from said side wall, is located in a substantially horizontal plane, and is adapted to guide a magazine for movement along said side wall; and limiting means carried by said guiding means for turning movement therewith and engaging a portion of said housing means when said guiding means is in said operating position thereof for limiting the turning movement of said magazine guiding means away from said rest position.

5. In a photographic projector for still pictures, in combination, housing means having a side wall formed with an elongated exterior recess; elongated, substantially rigid magazine guiding means having a rest position situated within said recess; pivot means carried by said side wall and operatively connected to said magazine guiding means for connecting the latter to said side wall for swinging movement relative thereto between said rest position and an operating position where said magazine guiding means projects laterally from said side wall, is located in a substantially horizontal plane, and is adapted to guide a magazine for longitudinal movement along said side wall of said housing means; and overcenter spring means operatively connected to said housing means and said magazine guiding means for yieldably urging the latter to said rest position thereof as well as to said operating position thereof, said magazine guiding means during turning between said positions moving through a dead-center position of said overcenter spring means.

6. In a photographic projector as recited in claim 5, said overcenter spring means including an elongated leaf spring fixedly carried by said side wall in the interior of said housing means and a projection fixed to said magazine guiding means for swinging movement therewith and engaging said leaf spring to deflect the latter during turning of said magazine guiding means between said position thereof, said projection deflecting said leaf spring to a maximum extent when said magazine guiding means is between said positions thereof.

7. In a photographic projector for still pictures, in combination, housing means having an elongated side wall; elongated, substantially rigid magazine guiding means extending along said side wall at the exterior thereof; pivot means carried by said side wall and operatively connected to said magazine guiding means for connecting the latter to said side wall for swinging movement between a rest position where said magazine guiding means is located substantially in its entirety directly next to said side wall and an operating position where said magazine guiding means projects laterally from said side wall and is situated in a substantially horizontal plane for guiding the magazine for movement longitudinally along said side wall of said housing means; a projection lamp; an electrical circuit in which said lamp is located; switch means connected to said circuit for opening and closing the latter so as to deenergize and energize said lamp, respectively; and switch-actuating means carried by said magazine guiding means for movement therewith and automatically closing said switch when said magazine guiding means is swung to said operating position thereof, so that the lamp is automatically energized when said magazine guiding means is placed in said operating position thereof.

8. A projector as recited in claim 7 and wherein said switch-actuating means is in the form of a projection fixed to said magazine guiding means for turning movement therewith, said switch being located in the path of turning movement of said projection during turning of said magazine guiding means from said rest to said operating position thereof to be engaged by said projection and closed thereby when said magazine guiding means reaches said operating position.

9. In a photographic projector for still pictures, in combination, housing means having a side wall; elongated, substantially rigid magazine guiding means extending along said side wall; pivot means carried by said side wall and operatively connected to said magazine guiding means to connect the latter to said side wall for swinging movement relative thereto between a rest position where said magazine guiding means is located substantially in its entirety next to said side wall and an operating position where said magazine guiding means projects laterally from said side wall and is located in a substantially horizontal plan for guiding an elongated magazine for movement longitudinally along said side wall of said housing means; rotary magazine-advancing means carried by said magazine guiding means for rotation with respect thereto and for swinging movement therewith between said positions; and motion transmitting means carried by said housing in the interior thereof for transmitting motion to said rotary magazine-advancing means when said magazine guiding means is in said operating position thereof, said rotary magazine-advancing means moving into mesh with said motion transmitting means when said magazine guiding means is swung from said rest to said operating position thereof.

10. In a projector as recited in claim 9, said rotary magazine-advancing means including a rotary gear carried by said magazine guiding means, and said motion transmission means including a drum wheel with which said gear meshes when said magazine guiding means is turned to said operating position thereof.

11. In a projector as recited in claim 9, said rotary magazine-advancing means being in the form of a bevel gear having an angle of less than 30° and said motion transmission means including a second bevel gear with which said bevel gear carried by said magazine guiding means meshes when said magazine guiding means is swung from said rest to said operating position thereof.

12. In a photographic projector, for projecting still pictures, in combination, housing means having an elongated side wall; elongated, substantially rigid magazine guiding means extending along side of said side wall at the exterior thereof; pivot means carried by said side wall and operatively connected to said magazine guiding means to connect the latter to said side wall for swinging movement relative thereto between a rest position where said magazine guiding means is located substantially in its entirely next to said side wall and an operating position where said magazine guiding means projects laterally from said side wall and is located substantially in a horizontal plane for supporting a magazine for longitudinal movement along said side wall of said housing means; and elongated extension means shiftably carried by said magazine guiding means for longitudinal shifting movement relative thereto to positions where said extension means projects forwardly beyond said magazine guiding means to support the front end of a magazine which has advanced with its front end forwardly beyond said magazine guiding means.

13. In a photographic projector, for projecting still pictures, in combination, housing means having an elongated side wall; elongated, substantially rigid magazine guiding means extending alongside of said side wall at the exterior thereof; pivot means carried by said side wall and operatively connected to said magazine guiding means to connect the latter to said side wall for swinging movement relative thereto between a rest position where said magazine guiding means is located substantially in its entirely next to said side wall and an operating position where said magazine guiding means projects laterally from said side wall and is located substantially in a horizontal plane for supporting a magazine for longitudinal movement along said side wall of said housing means; and elongated extension means shiftably carried by said magazine guiding means for longitudinal shifting movement relative thereto to positions where said extension means projects forwardly beyond said magazine guiding means to support the front end of a magazine which has advanced with its front end forwardly beyond said magazine guiding means, said extension means having a rest position where it substantially entirely overlaps said magazine guiding means and said extension means having a front projection in the path of movement of a magazine guided by said magazine guiding means to be engaged by the magazine so that the latter will automatically advance said extension means forwardly with respect to said magazine guiding means during the forward advance of a magazine guided thereby.

14. In a projector as recited in claim 13, spring means operatively connected to said extension means for automatically returning the latter to said rest position when a magazine is not carried by said magazine guiding means and does not engage said projection of said extension means to displace the latter forwardly beyond said magazine guiding means.

15. In a photographic projector for still pictures, in combination, housing means having an elongated side wall; elongated, substantially rigid magazine guiding means extending along said side wall; pivot means carried by said side wall and operatively connected to said magazine guiding means for connecting the latter to said side wall for swinging movement relative thereto between a rest position where said magazine guiding means is located substantially entirely on said side wall directly next thereto and an operating position where said magazine guiding means projects laterally from said side wall and is located substantially in a horizontal plane for supporting and guiding an elongated magazine for longitudinal movement along said side wall, said magazine guiding means having a pair of longitudinal wall portions spaced one above the other when said magazine guiding means in said operating position thereof and defining between themselves an elongated space having at least a front open end; an elongated extension member located in said space for longitudinal sliding movement relative to said magazine guiding means forwardly beyond said open end of said space, said extension having a front end carrying a projection in the path of movement of a magazine to be engaged and moved thereby so that a forwardly advancing magazine will automatically displace said extension forwardly with respect to said magazine guiding means so that the extension will maintain the magazine in a substantially horizontal attitude during advance of a magazine forwardly beyond said magazine guiding means; and spring means located within said space and operatively connected to said magazine guiding means and said extension for retracting the latter into said space when a magazine does not displace an extension forwardly beyond said open end of said space.

References Cited by the Examiner

UNITED STATES PATENTS

| | | | |
|---|---|---|---|
| 2,756,630 | 7/1956 | Goldberg | 88—28 |
| 2,878,604 | 3/1959 | Mulch | 40—79 |
| 3,186,298 | 6/1965 | Schlesinger et al. | 88—28 |

NORTON ANSHER, *Primary Examiner.*